(12) United States Patent
Ejiri

(10) Patent No.: US 6,893,747 B2
(45) Date of Patent: May 17, 2005

(54) MAGNETIC TAPE

(75) Inventor: Kiyomi Ejiri, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/172,989

(22) Filed: Jun. 18, 2002

(65) Prior Publication Data

US 2003/0049491 A1 Mar. 13, 2003

(30) Foreign Application Priority Data

Jun. 26, 2001 (JP) ............................ P.2001-193077

(51) Int. Cl.$^7$ .............................................. G11B 5/706

(52) U.S. Cl. ..................... 428/694 BH; 428/694 BS

(58) Field of Search ................. 428/694 BH, 694 BS

(56) References Cited

U.S. PATENT DOCUMENTS

| 5,480,713 | A | * | 1/1996 | Sasaki et al. ............... 428/323 |
| 5,976,660 | A | | 11/1999 | Saito et al. |
| 6,372,338 | B1 | * | 4/2002 | Jeffers et al. ............... 428/329 |
| 6,521,361 | B2 | * | 2/2003 | Ejiri et al. ............ 428/694 BN |

* cited by examiner

*Primary Examiner*—Stevan A. Resan
(74) *Attorney, Agent, or Firm*—Sughrue Mion, PLLC

(57) ABSTRACT

A magnetic tape is disclosed, comprising a support having thereon a magnetic layer comprising ferromagnetic particles and a binder as the main components, (i) the magnetic tape being for use in a magnetic recording/reproducing system in which signals recorded are reproduced with a magneto resistive head, (ii) the ferromagnetic particles contained in the magnetic layer being hexagonal-ferrite magnetic particles having an average tabular diameter of from 10 to 40 nm, and the magnetic layer having a machine direction coercive force $H_c$ of from 158 to 350 kA/m, a squareness ratio SQ⊥ as measured in the direction perpendicular to the magnetic plane of 0.5 or lower, and a thickness of from 30 to 300 nm.

9 Claims, No Drawings

MAGNETIC TAPE

FIELD OF THE INVENTION

The present invention relates to a magnetic tape of the coated type (i.e., a magnetic recording particulate tape) for high-density recording. More particularly, the present invention relates to a magnetic tape for use in a system in which signals are bidirectionally recorded/reproduced along the tape machine direction with a magneto resistive head (MR head).

BACKGROUND OF THE INVENTION

In the field of magnetic tapes, investigations are recently being made enthusiastically on magnetic tapes as external storages for recording computer data (the so-called backup tapes), with the spread of minicomputers, personal computers, and office computers such as work stations. Especially in magnetic tapes for serves where large quantities of data are dealt with, the so-called linear serpentine mode has been put to practical use, in which signals are bidirectionally recorded/reproduced along the tape machine direction so as to heighten the speed of data processing. For practically using magnetic tapes in such applications, there is an especially strong desire for an improvement in recording capacity for attaining an increased recording capacity and a reduced recording-medium size, besides the desire for a size reduction and an increase in information-processing ability in computers.

Magnetic recording media heretofore in wide use comprise a nonmagnetic support and, formed thereover by coating, a magnetic layer comprising a binder and dispersed therein iron oxide, cobalt-modified iron oxide, $CrO_2$, ferromagnetic metal particles, or hexagonal-ferrite particles. Of these magnetic materials, fine particles of hexagonal ferrites are known to have excellent high-density recording characteristics. However, in recording/reproducing with an inductive head which has hitherto been mainly used in the systems employing flexible media, the fine particles of a hexagonal ferrite have a low saturation magnetization and a sufficient output has not been obtained therewith.

In the removable recording employing such flexible media, however, the magneto resistive heads (MR heads) in use with hard disks have come to be used.

Since MR heads have high sensitivity, a sufficient reproduction output is obtained even with use of fine particles of a hexagonal ferrite. It is known that due to the noise reduction characteristic of hexagonal ferrites, a high C/N ratio is obtained. For example, Japanese Patent Application (Laid-Open) Nos. 342515/1994 and 302243/1998 disclose a technique which employs fine particles of barium ferrite (BaFe) and uses an MR head for reproduction.

However, since the well-known hexagonal-ferrite fine particles such as those shown above not only have a tabular shape but have an axis of easy magnetization perpendicular to the plane, the tabular particles are oriented, by calendering during the production of coated-type magnetic tapes, so that the tabular planes become parallel to the tape machine direction. As a result, the amount of magnetization components perpendicular to the magnetic plane is increased. The isolated pulse waveform becomes asymmetrical due to the perpendicular magnetization components and the reproduction output hence changes with the direction of reproduction. Namely, the related-art magnetic recording medium employing fine particles of a hexagonal ferrite is unsuitable for use in recording/reproducing in the linear serpentine mode.

Furthermore, even when that magnetic recording medium of the related art is used in a mode other than the linear serpentine mode, such as, e.g., helical scan mode, the results are an increased peak shift in high-density recording due to waveform interference and the necessity of waveform equalization.

SUMMARY OF THE INVENTION

An object of the present invention is to provide a magnetic tape which has satisfactory electromagnetic characteristics, is significantly reduced in error rate especially in a high-density recording region, and can be produced at low cost with excellent productivity.

Another object of the present invention is to provide a magnetic tape of the coated type (i.e., a magnetic (recording) particulate tape) which, when used in a recording/reproducing system employing an MR head, shows excellent suitability for high-density recording with reduced noise.

The present invention provides a magnetic tape having the following constitutions, whereby those objects of the present invention are accomplished.

(1) A magnetic tape comprising a support having there on a magnetic layer comprising ferromagnetic particles and a binder as the main components,
  (i) the magnetic tape being for use in a magnetic recording/reproducing system in which signals recorded are reproduced with a magneto resistive head,
  (ii) the ferromagnetic particles contained in the magnetic layer being hexagonal-ferrite magnetic particles having an average tabular diameter of from 10 to 40 nm, and the magnetic layer having a machine direction coercive force $H_c$ of from 158 to 350 kA/m, a squareness ratio $SQ\perp$ as measured in the direction perpendicular to the magnetic plane of 0.5 or lower, and a thickness of from 30 to 300 nm.

(2) The magnetic tape as described in (1) above which is for use in recording/reproducing in the linear serpentine mode.

In the magnetic tape of the present invention, hexagonal-ferrite magnetic particles which are fine particles and have a high $H_c$ are used to reduce the amount of magnetization components perpendicular to the magnetic plane (regulate the $SQ\perp$ to 0.5 or lower) and the thickness of the magnetic layer is regulated to 30 to 300 nm. As a result, reproduction can be conducted with diminished waveform distortion and reduced noise. This effect is markedly produced when the magnetic tape is used in the linear serpentine mode in which signals are bidirectionally recorded/reproduced along the machine direction.

DETAILED DESCRIPTION OF THE INVENTION

[Magnetic Layer]

In the magnetic tape of the present invention, the magnetic layer may be formed on the support either directly or through a nonmagnetic lower layer. Since the magnetic layer, which is for use with an MR head, has a reduced thickness, it is preferred to employ a multilayer constitution including a nonmagnetic lower layer. The machine direction coercive force $H_c$ of the magnetic layer is from 158 to 350 kA/m (2,000 to 4,430 Oe), preferably from 170 to 280 kA/m. In case where the machine direction coercive force $H_c$ of the magnetic layer is lower than 158 kA/m, the reproduction output is insufficient. In case where the machine direction coercive force thereof exceeds 350 kA/m, magnetic head saturation occurs, resulting in insufficient recording.

The magnetic layer desirably has such a magnetization distribution that the amount of components which undergo a (magnetic) flux revolution upon application of a magnetic field of 80 kA/m (1,000 Oe) or lower is preferably smaller than 1%, more preferably 0.7% or smaller, most preferably 0.5% or smaller.

The thickness of the magnetic layer is from 30 to 300 nm, preferably from 50 to 250 nm, most preferably from 50 to 200 nm. Thicknesses thereof smaller than 30 nm result in an insufficient reproduction output. In case where the thickness thereof is larger than 300 nm, a phase difference arises between the magnetization component present in inner parts of the layer and the magnetization component present in surface parts of the layer, resulting in enhanced waveform asymmetry.

The squareness ratio SQ of the magnetic layer as measured in an in-plane direction is preferably from 0.6 to 0.95, more preferably from 0.65 to 0.85.

The squareness ratio $SQ\perp$ as measured in the direction perpendicular to the magnetic plane is 0.5 or lower, preferably 0.4 or lower, more preferably 0.35 or lower. Although the lower limit of $SQ\perp$ is theoretically 0, it is vertically 0.1 or higher.

[Ferromagnetic Particles]

The ferromagnetic particles used in the magnetic layer in the present invention are particles of a hexagonal ferrite. Examples thereof include substitution products of barium ferrite, strontium ferrite, lead ferrite, or calcium ferrite and cobalt substitution products. Specific examples thereof include barium ferrite and strontium ferrite each of the magnetoplumbite type, magnetoplumbite-type ferrites whose surface has been coated with spinel, and magnetoplumbite-type barium ferrite and strontium ferrite each partly containing a spinel phase. Such ferrites may contain atoms of elements other than the given elements. Examples of such optional elements include Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. In general, ferrites to which elements such as Co—Zn, Co—Ti, Co—Ti—Zr, Co—Ti—Zn, Ni—Ti—Zn, Nb—Zn—Co, Sb—Zn—Co, or Nb—Zn have been added can be used. Some ferrites contain peculiar impurities depending on raw materials or production processes.

The term "average tabular diameter" used for the hexagonal-ferrite magnetic particles means the average of the tabular diameters of the hexagonal plates. The average tabular diameter thereof is from 10 to 40 nm, preferably from 10 to 35 nm, more preferably from 15 to 35 nm. Especially in the case where an MR head is used for reproduction in order to attain an increased track density, the tabular diameter is preferably 35 nm or smaller because of the necessity of noise reduction. However, in case where the average particle diameter thereof is smaller than 10 nm, thermal fluctuations occur and stable magnetization cannot hence be expected. On the other hand, average tabular diameters thereof exceeding 40 nm result in increased noises and are hence unsuitable for high-density magnetic recording according to the present invention. The average tabular ratio (arithmetic mean of tabular diameter/tabular thickness) of the magnetic particles is desirably from 1 to 15, preferably from 1 to 7. Although small values of the average tabular ratio are preferred from the standpoint of attaining a higher packing property in the magnetic layer, sufficient orientation cannot be obtained therewith. On the other hand, values of the average tabular ratio larger than 15 result in increased noises due to particle stacking.

When the magnetic particles have a size within that range, the particles have a specific surface area as measured by the BET method (SBET) of from 10 to 100 m²/g. The specific surface area roughly agrees with the arithmetic mean calculated from the particle tabular diameter and tabular thickness. The narrower distribution of tabular diameter/tabular thickness of the particle, the more the magnetic particles are usually preferred. A numerical comparison can be made by measuring arbitrarily selected five hundred particles on a TEM photograph of each particulate material. Although many particulate magnetic materials do not have a normal distribution, the magnetic particles to be used in the present invention are ones whose coefficient of variance represented by standard deviation based on the calculated average size (σ/average size) is generally from 0.1 to 2.0, preferably from 0.1 to 1.0, more preferably from 0.1 to 0.5.

For obtaining magnetic particles having a narrow particle size distribution, a technique is being used in which a reaction system for particle formation is kept as even as possible and the particles yielded are subjected to a treatment for distribution improvement. Examples of this treatment include a method in which the particles are treated with an acid solution to selectively dissolve ultrafine particles therein.

The hexagonal-ferrite fine particles have an average particle volume of generally from 1,000 to 10,000 nm³, preferably from 1,500 to 8,000 nm³, more preferably from 2,000 to 8,000 nm³.

Magnetic materials having a coercive force $H_c$ of about from 40 to 400 kA/m can usually be produced. Although higher values of $H_c$ are advantageous for high-density recording, $H_c$ is limited by the capacity of the recording head to be used. In the present invention, the $H_c$ of the magnetic material is about from 120 to 360 kA/m, preferably from 158 to 350 kA/m. When a head having a saturation magnetization exceeding 1.4 T is to be used, it is preferred to employ a magnetic material having an $H_c$ of 175 kA/m or higher. $H_c$ can be regulated by regulating particle size (tabular diameter/tabular thickness), the kind and amount of an element incorporated, the substitution site for the element, reaction conditions for particle formation, etc. The saturation magnetization $\sigma_s$ of the magnetic material is generally from 40 to 80 A·m²/kg. The finer the particles, the more the $\sigma_s$ tends to become low. Well known techniques for improving $\sigma_s$ include to combine a magnetoplumbite ferrite with a spinel ferrite and to select the kind and amount of an element to be incorporated. It is also possible to use a W-type hexagonal ferrite. Furthermore, a technique is being used in which before a magnetic material is dispersed, the surface of the magnetic particles is treated with a substance suitable for the dispersion medium and polymer to be used.

As the surface-treating agent, is used an inorganic compound or an organic compound. Representative examples of such compounds include the oxides or hydroxides of silicon, aluminum, and phosphorus, various silane coupling agents, and various titanium coupling agents. The amount of the surface-treating agent to be used may be from 0.1 to 10% based on the magnetic material.

The pH of the magnetic material also is important for dispersion. The optimal value of pH is generally in the range of about from 4 to 12 depending on the dispersion medium and polymer to be used. However, a pH of about from 6 to 11 is selected from the standpoints of the chemical stability of the medium and storage stability. The water content of the magnetic material also influences dispersibility. A water content of from 0.01 to 2.0% is generally selected although the optimal value thereof depends on the dispersion medium and polymer to be used. Examples of processes for producing a hexagonal ferrite include: a glass crystallization method which comprises mixing starting materials such as barium oxide, iron oxide, an oxide of a metal with which iron is to be substituted, and boron oxide as a glass-forming substance so as to result in a desired ferrite composition, melting the mixture, rapidly cooling the melt to form an amorphous material, and subsequently subjecting the amorphous material to a heat treatment and then to washing and pulverizing to thereby obtain a crystalline powder of barium ferrite; a hydrothermal reaction method which comprises neutralizing a solution of metal salts having a barium ferrite composition with an alkali, removing the by-product, subsequently heating the mixture in a liquid phase at 100° C. or higher, and then subjecting the mixture to washing, drying, and pulverization to obtain a crystalline powder of barium ferrite; and a coprecipitation method which comprises neutralizing a solution of metal salts having a barium ferrite composition with an alkali, removing the by-product, subsequently drying the mixture, treating the reaction product at 1,100° C. or lower, and then pulverizing it to obtain a crystalline powder of barium ferrite. The hexagonal ferrite to be used in the present invention may be one produced by any process.

[Specific Technique for Attaining $SQ\perp \leq 0.5$]

For enabling the magnetic layer in the present invention to have a perpendicular-direction squareness ratio $SQ\perp$ within the range shown above, the following technique can, for example, be used. A magnetic layer is formed on a nonmagnetic lower layer. This multilayer structure is subjected to magnetic orientation in the machine direction and then to calendering. In the calendering, the nonmagnetic lower layer functions as a cushioning layer to contract upon pressing by the calendering rolls and thereby enable the magnetic material in the upper layer to be less brought down. Thus, the perpendicular-direction squareness ratio $SQ\perp$ of the magnetic layer can be regulated so as to be within the range shown above.

The lower layer serving such a function can be formed, for example, by a method in which a binder having a glass transition point lower than the calendering temperature is incorporated and/or a method in which nonmagnetic particles having a high aspect ratio are used for forming voids prior to calendering. Either of these two methods or a combination of both may be used. Methods other than these may, of course, be used.

In the case where a binder having a glass transition point lower than the calendering temperature is used in the lower layer, the glass transition point of the binder is lower preferably by at least 10° C., more preferably by at least 20° C., than the calendering temperature.

In the case where nonmagnetic particles having a high aspect ratio are used in the lower layer, the aspect ratio of the nonmagnetic particles is preferably 3 or higher, more preferably 5 or higher, most preferably 7 or higher. The amount of the binder to be used for forming the nonmagnetic layer is preferably from 5 to 50% by weight, more preferably from 5 to 35% by weight, most preferably from 10 to 30% by weight, based on the nonmagnetic particles.

[Nonmagnetic Layer]

The nonmagnetic layer which may be formed as a lower layer between the support and the magnetic layer will be explained below in detail.

The lower layer is not particularly limited in constitution as long as it is substantially nonmagnetic. However, it usually comprises at least a resin. Preferred examples thereof include a layer comprising a resin and particles, e.g., inorganic particles or organic particles, dispersed in the resin. Although the inorganic particles are usually preferably nonmagnetic particles, magnetic particles may be used as long as the lower layer is substantially nonmagnetic.

The nonmagnetic particles can be selected, for example, from inorganic compounds such as metal oxides, metal carbonates, metal sulfates, metal nitrides, metal carbides, and metal sulfides. Examples of such inorganic compounds include α-alumina having an α-alumina having an α-conversion rate of 90% or higher, β-alumina, γ-alumina, θ-alumina, silicon carbide, chromium oxide, cerium oxide, α-ironoxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. These inorganic compounds may be used alone or in combination of two or more thereof. Especially preferred are titanium dioxide, zinc oxide, the iron oxides, and barium sulfate from the standpoints of the narrowness of particle size distribution and the availability of many techniques for function impartation. More preferred of these are titanium dioxide and α-iron oxide.

In the case of using nonmagnetic particles having a high aspect ratio in the lower layer in order to regulate the perpendicular-direction squareness ratio $SQ\perp$ of the magnetic layer so as to be within the range shown above, the aspect ratio of the nonmagnetic particles is as shown above. Preferred examples of the nonmagnetic particles having a high aspect ratio include α-iron oxide, titanium oxide, and alumina.

The particle size of the nonmagnetic particles is preferably from 0.005 to 2 $\mu$m. However, particulate nonmagnetic materials differing in particle size may be used in combination according to need. Alternatively, a single particulate nonmagnetic material having a widened particle diameter distribution may be used so as to produce the same effect. Especially preferred nonmagnetic particles have a particle size of from 0.01 to 0.2 $\mu$m. Especially when the nonmagnetic particles are a granular metal oxide, the average particle diameter thereof is preferably 0.08 $\mu$m or smaller. When the nonmagnetic particles are an acicular metal oxide, the long-axis length thereof is preferably 0.3 $\mu$m or shorter, more preferably 0.2 $\mu$m or shorter. The tap density thereof is generally from 0.05 to 2 g/mL, preferably from 0.2 to 1.5 g/mL. The water content of the nonmagnetic particles is generally from 0.1 to 5% by weight, preferably from 0.2 to 3% by weight, more preferably from 0.3 to 1.5% by weight. The pH of the nonmagnetic particles is generally from 2 to 11, and is preferably in the range of from 5.5 to 10.

The specific surface area of the nonmagnetic particles is generally from 1 to 100 m$^2$/g, preferably from 5 to 80 m$^2$/g, more preferably from 10 to 70 m$^2$/g. The crystallite size of the nonmagnetic particles is preferably from 0.004 to 1 $\mu$m more preferably from 0.04 to 0.1 $\mu$m. The oil absorption amount thereof as measured with DBP (dibutyl phthalate) is generally from 5 to 100 mL/100 g, preferably from 10 to 80 mL/100 g, more preferably from 20 to 60 mL/100 g. The specific gravity thereof is generally from 1 to 12, preferably from 3 to 6. The particle shape thereof may be any of acicular, spherical, polyhedral, and tabular shapes. The Mohs' hardness thereof is preferably from 4 to 10. The nonmagnetic particles have an SA (stearic acid) adsorption amount of generally from 1 to 20 $\mu$mol/m$^2$, preferably from 2 to 15 $\mu$mol/m$^2$, more preferably from 3 to 8 $\mu$mol/m$^2$. The pH thereof is preferably in the range of from 3 to 6. The nonmagnetic particles are preferably subjected to a surface treatment to thereby cause $Al_2O_3$, $SiO_2$, $TiO_2$, $ZrO_2$, $SnO_2$, $Sb_2O_3$, ZnO, or $Y_2O_3$ to be present on the surface of the particles. Especially preferred are $Al_2O_3$, $SiO_2$, $TiO_2$, and $ZrO_2$ from the standpoint of enhancing dispersibility. More preferred of these are $Al_2O_3$, $SiO_2$, and $ZrO_2$. These may be used in combination of two or more thereof or may be used alone.

The surface treatment may be conducted by suitable methods according to purposes. For example, a surface treatment layer formed by coprecipitation may be used. Alternatively, use may be made of a method in which alumina is deposited first and this surface layer is then treated with silica or a method in which the alumina treatment and silica treatment are conducted in the reversed order. Although a porous surface treatment layer may be formed according to purposes, it is generally preferred to form a surface treatment layer which is homogeneous and dense.

Specific examples of the nonmagnetic particles for use in the lower layer include Nanotite manufactured by Showa Denko K.K.; HIT-100 and ZA-G1 manufactured by Sumitomo Chemical Co., Ltd.; α-hematite DPN-250, DPN-250BX, DPN-245, DPN-270BX, DPN-500BX, DBN-SA1, and DBN-SA3 manufactured by Toda Kogyo Corp.; titanium oxide TTO-51B, TTO-55A, TTO-55B, TTO-55C, TTO-55S, TTO-55D, and SN-100 and α-hematite E270, E271, E300, and E303 manufactured by Ishihara Sangyo Kaisha, Ltd.; titanium oxide STT-4D, STT-30D, STT-30, and STT-65C and α-hematite α-40 manufactured by Titan Kogyo K.K.; MT-100S, MT-100T, MT-150W, MT-500B, MT-600B, MT-100F, and MT-500HD manufactured by Tayca Co., Ltd.; FINEX-25, BF-1, BF-10, BF-20, and ST-M manufactured by Sakai Chemical Industry Co., Ltd.; DEFIC-Y and DEFIC-R manufactured by Dowa Mining Co., Ltd.; AS2BM and $TiO_2$ P25 manufactured by Nippon Aerosil Co., Ltd.; 100A and 500A manufactured by Ube Industries, Ltd.; and nonmagnetic materials obtained by burning these.

A carbon black may be incorporated into the lower layer, whereby the well-known effects of lowering the surface electrical resistance $R_s$ and reducing the light transmittance can be produced and, simultaneously therewith, a desired value of micro-Vickers hardness can be obtained. It is also possible to incorporate a carbon black into the lower layer to thereby enable the layer to have the effect of storing a lubricant therein. Examples of the kinds of carbon blacks usable in the present invention include furnace black for rubbers, thermal black for rubbers, coloring black, and acetylene black. The carbon black to be incorporated into the lower layer should be one which has been optimized with respect to the following properties according to the desired effect. Use of a combination of two or more carbon blacks may produce an enhanced effect.

The carbon black to be incorporated into the lower layer has a specific surface area of generally from 100 to 500 $m^2/g$, preferably from 150 to 400 $m^2/g$, and a DBP absorption amount of generally from 20 to 400 mL/100 g, preferably from 30 to 400 mL/100 g. The particle diameter of the carbon black is generally from 5 to 80 nm, preferably from 10 to 50 nm, more preferably from 10 to 40 nm. The carbon black preferably has a pH of from 2 to 10, a water content of from 0.1 to 10%, and a tap density of from 0.1 to 1 g/mL. Specific examples of carbon blacks usable in the present invention include BLACKPEARLS 2000, 1300, 1000, 900, 800, 880, 700, and VULCAN XC-72 manufactured by Cabot Corp.; #3050B, #3150B, #3250B, #3750B, #3950B, #950, #650B, #970B, #8SOB, MA-600, MA-230, #4000, and #4010 manufactured by Mitsubishi Chemical Industries Ltd.; CONDUCTEX SC, RAVEN 8800, 8000, 7000, 5750, 5250, 3500, 2100, 2000, 1800, 1500, 1255, and 1250 manufactured by Columbian Carbon Co.; and Ketjen Black EC manufactured by Akzo N.V. Such carbon blacks may be surface-treated with a dispersant or the like or grafted with a resin before use. A carbon black whose surface has been partly graphitized may also be used.

Before being added to a coating solution, the carbon black may be dispersed in a binder. Those carbon blacks can be used in an amount of 50% by weight or less based on the inorganic particles and in an amount of 40% by weight or less based on the total amount of the nonmagnetic layer.

Those carbon blacks can be used alone or in combination of two or more thereof. With respect to carbon blacks usable in the present invention, reference may be made to, for example, Kâbon Burakku Binran (edited by Carbon Black Association, Japan).

Organic particles may be added to the lower layer according to purposes. Examples thereof include acrylic/styrene resin particles, benzoguanamine resin particles, melamine resin particles, and phthalocyanine pigments. Also usable are polyolefin resin particles, polyester resin particles, polyamide resin particles, polyimide resin particles, and poly(fluoroethylene) resins. For producing such organic particles, processes such as those described in Japanese Patent Application (Laid-Open) Nos. 18564/1987 and 255827/1985 may be used.

Binder resins, lubricants, dispersants, additives, solvents, methods for dispersion, and others usable for forming the lower layer may be the same as those for the magnetic layer which will be described later. In particular, with respect to the amounts and kinds of binder resins and the amounts and kinds of additives and dispersants, well-known techniques for forming magnetic layers are applicable.

[Binder]

As the binder for the magnetic layer or lower layer in the present invention is used any of well-known thermoplastic resins, thermosetting resins, and reactive resins and mixtures of these. The thermoplastic resins are ones having a glass transition temperature of from 100 to 150° C., a number-average molecular weight of from 1,000 to 200,000, preferably from 10,000 to 100,000, and a degree of polymerization of about from 50 to 1,000.

Examples of such thermoplastic resins include polymers or copolymers comprising units of one or more of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ethers as constituent units, and further include polyurethane resins and various rubbery resins. Examples of the thermosetting resins or reactive resins include phenolic resins, epoxy resins, curable polyurethane resins, urea resins, melamine resins, alkyd resins, reactive acrylic resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate. These resins are described in detail in Purasuchikku Handobukku, published by Asakura Shoten. Well-known electron beam-curable resins may be used for forming eachlayer. Examples of these resins and processes for producing these are described in detail in Japanese Patent Application (Laid-Open) No. 256219/1987. The resins enumerated above may be used alone or in combination of two or more thereof. However, preferred examples thereof include combinations of at least one member selected from vinyl chloride resins, vinyl chloride/vinyl acetate copolymers, vinyl chloride/vinyl acetate/vinyl alcohol copolymers, and vinyl chloride/vinyl acetate/maleic anhydride copolymers with polyurethane resin, and further include combinations of the at least one member, a polyurethane resin, and a polyisocyanate.

The polyurethane resin may have a well-known structure such as a polyester polyurethane, polyether polyurethane, polyether polyester polyurethane, polycarbonate polyurethane, polyester polycarbonate polyurethane, or polycaprolactone polyurethane. For obtaining further improved dispersibility and durability, it is preferred to use, according to need, one or more of the above-enumerated binders which have, incorporated therein through copolymerization or addition reaction, polar groups of at least one kind selected from —COOM, —SO$_3$M, —OSO$_3$M, —P=O(OM)$_2$, —O—P=O(OM)$_2$ (wherein M is a hydrogen atom or an alkali metal), OH, NR$_2$, N$^+$R$_3$ (R is a hydrocarbon group), an epoxy group, SH, CN, and the like. The amount of such polar groups is from $10^{-1}$ to $10^{-8}$ mol/g, preferably from $10^{-2}$ to $10^{-6}$ mol/g.

Specific examples of those binders that can be used in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corp.; MPR-TA, MPR-TA5, MPR-TAL, MPR-TSN, MPR-TMF, MPR-TS, MPR-TM, and MPR-TAO manufactured by Nisshin Chemical Co., Ltd.; 1000W, DX80, DX81, DX82, DX83, and 100FD manufactured by Denki Kagaku Kogyo K.K.; MR-104, MR-105, MR110, MR100, MR555, and 400X-110A manufactured by Nippon Zeon Co., Ltd.; Nippollan N2301, N2302, and N2304 manufactured by Nippon Polyurethane Industry Co. Ltd.; Pandex T-5105, T-R3080, T-5201, BurnockD-400, D-210-80, Crisvon 6109, and 7209 manufactured by Dainippon Ink & Chemicals, Inc.; Vylon UR8200, UR8300, UR8700, RV530, and RV280 manufactured by Toyobo Co., Ltd.; Daiferamine 4020, 5020, 5100, 5300, 9020, 9022, and 7020 manufactured by Dainichiseika Kogyo K.K.; MX5004 manufactured by Mitsubishi Chemical Industries Ltd.; Sunprene SP-150 manufactured by Sanyo Chemical Industries, Ltd.; and Salan F310 and F210 manufactured by Asahi Chemical Industry Co., Ltd.

In the case where a binder having a glass transition point lower than the calendering temperature is used in the lower layer in order to regulate the perpendicular-direction squareness ratio SQ⊥ of the magnetic layer so as to be within the range shown above, preferred examples of the binder include polyurethane resins in view of the fact that calendering is usually conducted at temperatures in the range of from 70 to 120° C.

The amount of the binder to be used for forming the nonmagnetic layer or magnetic layer is in the range of generally from 5 to 50% by weight (i.e. by mass), preferably from 10 to 30% by weight, based on the nonmagnetic particles or the ferromagnetic particles. In the case of employing a vinyl chloride resin, it is preferred to use the resin in an amount of from 5 to 30% by weight in combination with from 2 to 20% by weight polyurethane resin and from 2 to 20% by weight polyisocyanate. However, a polyurethane alone or a combination of a polyurethane and an isocyanate alone may be used, for example, when there is a possibility that a slight amount of chlorine might be released to cause head corrosion. In the case of using a polyurethane in the present invention, this resin is desirably one having a glass transition temperature of from −50 to 150° C., preferably from 0 to 100° C., more preferably from 30 to 90° C., an elongation at break of from 100 to 2,000%, a stress at break of from 0.05 to 10 kg/mm$^2$ (0.49 to 98 MPa), and a yield point of from 0.05 to 10 kg/mm$^2$ (0.49 to 98 MPa).

The magnetic tape of the present invention can have two or more coating layers. Consequently, it is, of course, possible to form the individual layers so that these layers differ from each other in binder amount, the proportion of a vinyl chloride resin, polyurethane resin, polyisocyanate, or another resin in the binder, the molecular weight and polar group content of each resin contained in the magnetic layer, the aforementioned physical properties of a resin, etc., according to need. Rather than being thus regulated, these factors should be optimized for each layer. For attaining this, well-known techniques concerning multilayered magnetic layers are applicable. For example, in the case of forming layers having different binder amounts, an increase in binder amount in the magnetic layer is effective in diminishing the scratches of the magnetic layer surface, while an increase in binder amount in the nonmagnetic layer is effective in imparting flexibility thereto and thereby improving head touching.

Examples of the polyisocyanate for use in the present invention include isocyanates such as otolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate, products of the reactions of these isocyanates with polyhydric alcohols, and polyisocyanates formed through condensation of isocyanates. These isocyanates are commercially available under the trade names of: Coronate L, Coronate HL, Coronate 2030, Coronate 2031, Millionate MR, and Millionate MTL manufactured by Nippon Polyurethane Industry Co., Ltd.; Takenate D-102, Takenate D-110N, Takenate D-200, and Takenate D-202 manufactured by Takeda Chemical Industries, Ltd.; and Desmodur L, Desmodur IL, Desmodur N, and Desmodur HL manufactured by Sumitomo Bayer Co., Ltd. For each layer, these polyisocyanates may be used alone, or used in combination of two or more thereof, taking advantage of a difference in curing reactivity.

[Carbon Black, Abrasive Material]

The carbon black for use in the magnetic layer in the present invention may be furnace black for rubbers, thermal black for rubbers, coloring black, acetylene black, or the like. The carbon black preferably has a specific surface area of from 5 to 500 m$^2$/g, a DBP absorption amount of from 10 to 400 mL/100 g, an average particle diameter of from 5 to 300 nm, preferably from 10 to 250 nm, more preferably from 20 to 200 nm, a pH of from 2 to 10, a water content of from 0.1 to 10%, and a tap density of from 0.1 to 1 g/ml. Specific examples of carbon blacks usable in the present invention include BLACKPEARLS 2000, 1300, 1000, 900, 905, 800, 700, and VULCAN XC-72 manufactured by Cabot Corp.; #80, #60, #55, #50, and #35 manufactured by Asahi Carbon Co., Ltd.; #2400B, #2300, #900, #1000, #30, #40, and #10B manufactured by Mitsubishi Chemical Industries Ltd.; CONDUCTEX SC, RAVEN 150, 50, 40, and 15, and RAVEN-MT-P manufactured by Columbian Carbon Co.; and Ketjen Black EC manufactured by Japan EC Co. These carbon blacks may be surface-treated with a dispersant or another agent or grafted with a resin before use. A carbon black whose surface has been partly graphitized may also be used.

Before being added to a magnetic coating solution, the carbon black may be dispersed in a binder. Those carbon blacks can be used alone or in combination. In the case of using a carbon black, its amount is preferably from 0.1 to 30% based on the magnetic material. The carbon black incorporated in the magnetic layer functions to prevent static change in the layer, to reduce the coefficient of friction of the layer, to impart a light-shielding property for the layer, and to improve the film strength. Such effects are produced to different degrees depending on the kind of carbon black used. Consequently, it is, of course, possible in the present invention to properly use carbon blacks according to purposes so as to give an upper magnetic layer and a lower nonmagnetic layer which differ in the kind, amount, and combination of carbon blacks, on the basis of the aforementioned properties including particle size, oil absorption amount, electrical conductivity, and pH. Rather than being thus regulated, these factors should be optimized for each layer. With respect to carbon blacks usable in the magnetic layer in the present invention, reference may be made to, for example, Kâbon Burakku Binran (edited by Carbon Black Association).

Abrasive materials usable in the present invention are known abrasive materials mostly having a Mohs' hardness of 6 or higher. Examples thereof include α-alumina having an α-alumina having an α-conversion rate of 90% or higher, β-alumina, silicon carbide, chromium oxide, ceriumoxide, α-iron oxide, corundum, artificial diamond, silicon nitride, silicon carbide, titanium carbide, titanium oxide, silicon dioxide, and boron nitride. These may be used alone or in combination. A composite made up of two or more of these abrasive materials (e.g., one obtained by surface-treating one abrasive material with another) may also be used. Although in some cases these abrasive materials contain compounds or elements other than the main component, the same effect is obtained with such abrasive materials as long as the content of the main component is 90% or higher. These abrasive materials have a particle size of preferably from 0.01 to 2 $\mu$m, more preferably from 0.05 to 1.0 $\mu$m, most preferably from 0.05 to 0.5 $\mu$m. An abrasive material having a narrower particle size distribution is preferred especially for enhancing electromagnetic characteristics. For improving durability, abrasive materials having different particle sizes may be used in combination according to need. Alternatively, a single abrasive material having a widened particle diameter distribution may be used so as to produce the same effect. The abrasive material to be used preferably has a tap density of from 0.3 to 2 g/ml, a water content of from 0.1 to 5%, a pH of from 2 to 11, and a specific surface area of from 1 to 30 $m^2$/g. Although abrasive materials that can be used in the present invention may have any particle shape selected from the acicular, spherical, and dice forms, a particle shape having a sharp corner as part of the contour is preferred because abrasive materials of this shape have high abrasive properties. Specific examples of abrasive materials usable in the present invention include AKP-12, AKP-15, AKP-20, AKP-30, AKP-50, HIT 20, HIT-30, HIT-55, HIT 60, HIT 70, HIT 80, and HIT 100, manufactured by Sumitomo Chemical Co., Ltd.; ERC-DBM, HP-DBM, and HPS-DBM manufactured by Reynolds Co.; WA 10000 manufactured by Fujimi Kenmazai Kogyo K.K.; UB 20 manufactured by C. Uyemura & Co., Ltd.; G-5, Kromex U2, and Chromex U1 manufactured by Nippon Chemical Industrial Co., Ltd.; TF 100 and TF 140 manufactured by Toda Kogyo Corp.; β-Random Ultrafine manufactured by Ibiden Co., Ltd.; and B-3manufactured by Showa Industry Co., Ltd. These abrasive materials may be added also to the nonmagnetic layer according to need. The incorporation of an abrasive material in the nonmagnetic layer has the effect of regulating the surface shape or regulating the projecting state of an abrasive material. The particle diameter and amount of the abrasive material to be added to each of the magnetic layer and the nonmagnetic layer should, of course, be optimized.

[Additives]

Additives having a lubricating, antistatic, dispersing, plasticizing, or another effect may be used in the magnetic layer and nonmagnetic layer in the present invention. Examples of such additives include molybdenum disulfide, tungsten disulfide, graphite, boron nitride, fluorinated graphite, silicone oils, silicones having a polar group, fatty acid-modified silicones, fluorine-containing silicones, fluorine-containing alcohols, fluorine-containing esters, polyolefins, polyglycols, esters of alkylphosphoric acids and alkali metal salts of the esters, esters of alkylsulfuric acids and alkali metal salts of the esters, poly (phenyl ether) s, phenylphosphonic acid, α-naphthylphosphoric acid, phenylphosphoric acid, diphenylphosphoric acid, p-ethylbenzenephosphonic acid, phenylphosphinic acid, aminoquinones, various silane coupling agents, titanium coupling agents, fluorine-containing alkylsulfuric acid esters and alkali metal salts of the esters, monobasic fatty acids having 10 to 24 carbon atoms (which may have an unsaturated bond or be branched) and metal salts (e.g., lithium, sodium, potassium, or copper salts) of these acids, mono-, di-, tri-, tetra-, penta-, and hexahydric alcohols having 12 to 22 carbon atoms (which may have an unsaturated bond or be branched), alkoxyalcohols having 12 to 22 carbon atoms, mono-, di-, or triesters of a monobasic fatty acid having 10 to 24 carbon atoms (which may have an unsaturated bond or be branched) with any one of mono-, di-, tri-, tetra-, penta-, and hexahydric alcohols having 2 to 12 carbon atoms (which may have an unsaturated bond or be branched), fatty acid esters of monoalkyl ethers of alkylene oxide polymers, fatty acid amides having 8 to 22 carbon atoms, and aliphatic amines having 8 to 22 carbon atoms.

Examples of the fatty acids include capric acid, caprylic acid, lauric acid, myristic acid, palmitic acid, stearic acid, behenic acid, oleic acid, elaidic acid, linoleic acid, linolenic acid, and isostearic acid. Examples of the esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palpitate, 2-hexyldodecyl palpitate, isohexadecyl stearate, oleyl oleate, dodecyl stearate, tridecyl stearate, erucic acid oleyl, neopentyl glycol didecanoate, and ethylene glycol dioleate. Examples of the alcohols include oleyl alcohol, stearyl alcohol, and lauryl alcohol. Surfactants are also usable. Examples thereof include nonionic surfactants such as those of the alkylene oxide type, glycerol type, glycidol type, and alkylphenol ethylene oxide adduct type; cationic surfactants such as cyclic amines, ester amides, quaternary ammonium salts, hydantoin derivatives, heterocyclic compounds, and phosphonium or sulfonium compounds; anionic surfactants containing an acid radical such as a carboxylic acid, sulfonic acid, phosphoric acid, sulfate, or phosphate radical; and amphoteric surfactants such as amino acids, aminosulfonic acids, esters of sulfuric or phosphoric acid with amino-alcohols, and alkylbetaines. These surfactants are described in detail in Kaimen Kasseizai Binran (published by Sangyo Tosho K.K.). These additives including lubricants and antistatic agents need not be 100% pure, and may contain impurities such as isomers, unreacted products, by-products, decomposition products, oxidation products, etc., besides the main components. The content of these impurities is desirably 30% or lower, preferably 10% or lower.

Those lubricants and surfactants usable in the present invention have different physical functions, and the kinds and amounts of such ingredients and a lubricant proportion for producing a synergistic effect should be optimized according to purposes. Lubricants or surfactants may be used, for example, in the following manners: fatty acids having different melting points are used for the nonmagnetic layer and the magnetic layer, respectively, to control the bleeding to the surface; esters differing in boiling point, melting point, or polarity are used to control the bleeding to the surface; surfactant amounts are regulated to improve the stability of coating; and a larger lubricant amount is used for an interlayer to obtain an improved lubricating effect. It is a matter of course that manners of using lubricants or surfactants are not limited to these examples. In general, the total amount of the lubricants to be used is selected from the range of from 0.1 to 50%, preferably from 2 to 25%, based on the magnetic material or the nonmagnetic particles.

Part or all of the additives to be used in the present invention maybe added at any step in the course of the production of a magnetic coating solution or nonmagnetic coating solution. Examples of addition techniques include: to mix the additives with a magnetic material prior to a kneading step; to add the additives during the step of kneading a magnetic material together with a binder and a solvent; to add the additives at a dispersing step; to add the additives after dispersion; and to add the additives immediately before coating. Some purposes may be accomplished by forming a magnetic layer by coating and then applying a part or all of one or more additives simultaneously or successively according to the purposes. It is also possible to apply a lubricant to the surface of the magnetic layer after calendering or after completion of slitting, according to purposes. Well-known organic solvents can be used in the present invention. For example, the solvents shown in Japanese Patent Application (Laid-Open) No. 68453/1994 can be used.

[Layer Constitution]

In the layer constitution of the magnetic tape of the present invention, the support has a thickness of generally from 2 to 100 $\mu$m, preferably from 2 to 80 $\mu$m. For computer tapes, a support having a thickness in the range of generally from 3.0 to 6.5 $\mu$m (preferably from 3.0 to 6.0 $\mu$m, more preferably from 4.0 to 5.5 $\mu$m) is used.

An undercoat layer may be formed between the support and the nonmagnetic layer or magnetic layer for the purpose of improving adhesion. This undercoat layer has a thickness of generally from 0.01 to 0.5 $\mu$m, preferably from 0.02 to 0.5 $\mu$m. The recording medium of the present invention may be a tape-form medium produced by forming a nonmagnetic layer and a magnetic layer on each side of a support, or may be a tape-form medium produced by forming these layers on only one side of a support. In this case, a back coat layer may be formed on the side opposite to the nonmagnetic layer and magnetic layer for the purpose of producing an antistatic effect, anti curling effect, etc. This back coat layer has a thickness of generally from 0.1 to 4 $\mu$m, preferably from 0.3 to 2.0 $\mu$m. The undercoat layer and back coat layer each may be a well-known layer.

The nonmagnetic layer has a thickness of generally from 0.2 to 5.0 $\mu$m, preferably from 0.3 to 3.0 $\mu$m, more preferably from 1.0 to 2.5 $\mu$m. The nonmagnetic layer produces its effects as long as it is substantially nonmagnetic. For example, even when the nonmagnetic layer contains a slight amount of a magnetic material either as an impurity or as an ingredient purposely incorporated, the effects of the present invention are brought about. It is a matter of course that such constitution can be regarded as substantially the same as that of the present invention. The term "substantially nonmagnetic" as used herein generally means that the residual magnetic flux density of the nonmagnetic layer is 0.01 T or lower or the coercive force thereof is 7.96 kA/m (100 Oe) or lower, and preferably means that the nonmagnetic layer has no residual magnetic flux density and no coercive force.

[Back Coat Layer]

Compared to video tapes and audio tapes, the magnetic tapes for computer data recording generally are strongly required to have a high degree of suitability for repetitions of running. For maintaining the high degree of running durability required, the back coat layer preferably contains a carbon black and inorganic particles.

As the carbon black is preferably used a combination of two kinds of carbon blacks differing in average particle diameter. In this case, a preferred combination comprises a finely particular carbon black having an average particle diameter of from 10 to 20 nm and a coarse carbon black having an average particle diameter of from 230 to 300 nm. Addition of such a finely particulate carbon black is generally effective in regulating the back coat layer so as to have a low surface electrical resistance and a low light transmittance. Since there are many magnetic recording apparatus in which the light transmittance of a tape is utilized as a signal for operation, the addition of a finely particulate carbon black is especially effective in such a case. Furthermore, finely particulate carbon blacks generally have the high ability to hold a liquid lubricant and hence contribute to a reduction in coefficient of friction when a lubricant is used therewith in combination.

On the other hand, the coarse carbon black having an average particle diameter of from 230 to 300 nm not only functions as a solid lubricant but also forms minute projections on the surface of the back coat layer to reduce the contact area and thereby contribute to a reduction in coefficient of friction. However, use of the coarse carbon black alone has a drawback that when the tape is used under severe running conditions, carbon black particles are apt to fall down from the back coat layer due to tape sliding, leading to an increased error frequency.

Specific examples of commercial products of the finely particulate carbon black include the following. The average particle diameters thereof are shown in parentheses. RAVEN 2000B (18 nm) and RAVEN 1500B (17 nm) (manufactured by Columbian Carbon Co.); BP 800 (17 nm) (manufactured by Cabot Corp.); PRINTEX 90 (14 nm), PRINTEX 95 (15 nm), PRINTEX 85 (16 nm), and PRINTEX 75 (17 nm) (manufactured by Degussa AG); and #3950 (16 nm) (manufactured by Mitsubishi Chemical Industries Ltd.).

Specific examples of commercial products of the coarse carbon black include Thermal Black (270 nm) (manufactured by Cancarb Ltd.) and RAVEN MTP (275 nm) (manufactured by Columbian Carbon Co.).

When a finely particulate carbon black and coarse carbon black which have average particle diameters of from 10 to 20 nm and from 230 to 300 nm, respectively, are used in the back coat layer as two kinds of carbon blacks differing in average particle diameter, then the proportion (by weight) of the former to the latter carbon black is preferably in the range of from 98:2 to 75:25, more preferably from 95:5 to 85:15.

The amount of the carbon black (total carbon black amount when two or more carbon blacks are used) in the back coat layer is generally from 30 to 80 parts by weight, preferably from 45 to 65 parts by weight, per 100 parts by weight of the binder.

The inorganic particles to be used preferably comprise a combination of two particulate materials differing in hardness. For example, it is preferred to use soft inorganic particles having a Mohs' hardness of from 3 to 4.5 and hard inorganic particles having a Mohs' hardness of from 5 to 9. Addition of the soft inorganic particles having a Mohs' hardness of from 3 to 4.5 is effective in stabilizing the coefficient of friction during repetitions of running. In addition, such soft inorganic particles, which have a hardness within that range, do not abrade sliding guide poles. These inorganic particles preferably have an average particle diameter in the range of from 30 to 50 nm.

Examples of the soft inorganic particles having a Mohs' hardness of from 3 to 4.5 include calcium sulfate, calcium carbonate, calcium silicate, barium sulfate, magnesium carbonate, zinc carbonate, and zinc oxide. These may be used alone or in combination of two or more thereof.

The amount of the soft inorganic particles contained in the back coat layer is in the range of preferably from 10 to 140 parts by weight, more preferably from 35 to 100 parts by weight, per 100 parts by weight of the carbon black.

Addition of the hard inorganic particles having a Mohs' hardness of from 5 to 9 enhances the strength of the back coat layer to improve running durability. When these inorganic particles are used in combination with a carbon black and the soft inorganic particles described above, the back coat layer has improved durability with reduced deterioration in repetitions of sliding. Furthermore, the addition of the hard inorganic particles imparts a moderate abrading ability to the layer to thereby diminish the adhesion of scratched powders to tape guide poles, etc. Especially when the hard inorganic particles are used in combination with the soft inorganic particles, the back coat layer has improved sliding properties on guide poles having a rough surface, whereby the coefficient of friction of the back coat layer can also be stabilized.

The hard inorganic particles preferably have an average particle size in the range of from 80 to 250 nm (more preferably from 100 to 210 nm).

Examples of the hard inorganic particles having a Mohs' hardness of from 5 to 9 include α-iron oxide, α-alumina, and chromium oxide ($Cr_2O_3$). These particulate materials may be used alone or in combination of two or more thereof. Preferred of these are α-iron oxide and α-alumina. The amount of the hard inorganic particles contained in the back coat layer is generally from 3 to 30 parts by weight, preferably from 3 to 20 parts by weight, per 100 parts by weight of the carbon black.

When soft inorganic particles and hard inorganic particles are to be used in combination in the back coat layer, these two kinds of inorganic particles are preferably ones selected so that the difference in hardness between the soft inorganic particles and the hard inorganic particles is 2 or more (more preferably 2.5 or more, most preferably 3 or more) The back coat layer preferably contains the two particulate inorganic materials differing in Mohs' hardness and each having a specific average particle size and further contains the two carbon blacks differing in average particle size.

A lubricant can be incorporated into the back coat layer. One or more lubricants suitably selected from the lubricants enumerated above as lubricants usable in the nonmagnetic layer or magnetic layer described above may be used. The amount of the lubricant to be added to the back coat layer is generally from 1 to 5 parts by weight per 100 parts by weight of the binder.

[Support]

The support used in the present invention is not particularly limited. However, the support is preferably a substantially nonmagnetic flexible support.

As the flexible support for use in the present invention can be employed a well-known film. Examples thereof include films of polyesters such as poly(ethylene terephthalate) and poly (ethylene naphthalate) polyolefins, cellulose triacetate, polycarbonates, aromatic polyamides, aliphatic polyamides, polyimides, poly(amide-imide)s, polysulfones, and polybenzoxazole. Preferred of these are high-strength supports made of poly(ethylene naphthalate), a polyamide, or the like. A laminate support such as that described in Japanese Patent Application (Laid-Open) No. 224127/1991 may be used according to need so that the magnetic layer surface and the base surface differ in surface roughness. These supports may be subjected beforehand to corona discharge treatment, plasma treatment, easy adhesion treatment, heat treatment, dust-removing treatment, etc. An aluminum or glass base may be also used as the support in the present invention.

Supports advantageously usable for accomplishing the aims of the present invention are ones which have a central-plane average surface roughness Ra as measured with TOPO-3D, manufactured by WYKO Corp., of preferably 8.0 nm or lower, more preferably 4.0 nm or lower, most preferably 2.0 nm or lower. Besides having such a low central plane average surface roughness, these supports are preferably free from projections as large as 0.5 μm or more. The state of the surface roughness can be freely controlled by regulating the size and amount of a filler which is incorporated into the support according to need. Examples of the filler include oxides or carbonates of calcium, silicon, and titanium and fine organic powders such as acrylic powders. The support preferably has a maximum height $R_{max}$ of 1 μm or smaller, a ten-point average roughness $R_z$ of 0.5 μm or lower, a central plane peak height $R_p$ of 0.5 μm or smaller, a central plane valley depth $R_v$ of 0.5 μm or smaller, a central plane areal ratio $S_r$ of from 10 to 90%, and an average wavelength $\lambda_a$ of from 5 to 300 μm. The surface projections on the support can be controlled with a filler so as to have any desired distribution, for the purpose of obtaining the desired electromagnetic characteristics and durability. The number of surface projections respectively having sizes of various ranges of from 0.01 μm to 1 μm can be regulated so as to be from 0 to 2,000 per 0.1 $mm^2$. The support to be used in the present invention has an F-5 value of preferably from 5 to 50 kg/$mm^2$ (49 to 490 MPa). The degree of thermal shrinkage of the support as measured under the conditions of 100° C. and 30 minutes is preferably 3% or lower, more preferably 1.5% or lower, and the degree of thermal shrinkage thereof as measured under the conditions of 80° C. and 30 minutes is preferably 1% or lower, more preferably 0.5% or lower. The strength at break of the support is preferably from 5 to 100 kg/$mm^2$ (≈49 to 980 MPa), and the modulus of elasticity thereof is preferably from 100 to 2,000 kg/$mm^2$ (√0.98 to 19.6 GPa). The thermal expansivity of the support is generally from $10^{-4}$ to $10^{-8}$/° C., preferably from $10^{-5}$ to $10^{-6}$/° C., and the hygroexpansivity thereof is generally $10^{-4}$/RH % or lower, preferably $10^{-5}$/RH % or lower. It is preferred that the support be almost homogeneous in each of these thermal, dimensional, and mechanical properties in such a degree that the difference in each property between any in-plane directions in the support is within 10%.

[Process for Production]

A process for producing a magnetic coating solution or nonmagnetic coating solution to be used for producing the magnetic tape of the present invention comprises at least a kneading step and a dispersing step, and may further comprise a mixing step which may optionally be conducted before and after the two steps. Each step may include two or more stages. Each of the materials for use in the present invention, including a magnetic material, nonmagnetic particles, binder, carbon black, abrasive material, antistatic agent, lubricant, and solvent, may be added in any step either at the beginning of or during the step. Furthermore, each raw material may be added portion-wise in two or more steps. For example, a polyurethane may be added portion-wise so that it is added in each of the kneading step, dispersing step, and mixing step for viscosity adjustment after the dispersion. Well-known manufacturing techniques can be used as part of the process in order to accomplish the aims of the present invention. In the kneading step is preferably used a kneading machine having a high kneading power, such as an open kneader, continuous kneader, pressure kneader, or extruder. In the case of using a kneader, the magnetic material or nonmagnetic particles are kneaded together with all or part (preferably at least 30%) of the binder, the binder amount being in the range of from 15 to 500 parts per 100 parts of the magnetic material. Details of this kneading treatment are given in Japanese Patent Application (Laid-Open) Nos. 106338/1989 and 79274/1989. Although glass beads can be used for particle dispersion in preparing coating solutions respectively for forming a magnetic layer and a nonmagnetic layer, it is preferred to use zirconia beads, titania beads, or steel beads, which are dispersing media having a high specific gravity. Such a dispersing medium optimized in particle diameter is used in an optimal loading (i.e., a packing ratio). Well-known dispersing machines can be used.

In the case where a magnetic tape having a multilayer constitution according to the present invention is produced through coating, it is preferred to use any of the following methods.

The first method is to firstly form a lower layer through coating with a coating apparatus generally used for applying magnetic coating solutions, e.g., agravure coating, roll coating, blade coating, or extrusion coating apparatus, and then form an upper layer, while the lower layer is still in a wet state, through coating with the support-pressing extrusion coater disclosed in Japanese Patent Publication No. 46186/1989 or Japanese Patent Application (Laid-Open) No. 238179/1985 or 265672/1990.

The second method is to almost simultaneously form an upper layer and a lower layer through coating with a single coating head having therein two slits for passing coating solutions, such as those disclosed in Japanese Patent Application (Laid-Open) Nos. 88080/1988, 17971/1990, and 265672/1990.

The third method is to almost simultaneously form an upper layer and a lower layer through coating with the extrusion coater equipped with a back-up roll as disclosed in Japanese Patent Application (Laid-Open) No. 174965/1990.

For preventing the electromagnetic characteristics and other properties of the magnetic tape from being impaired by cohesion of magnetic particles, it is desirable to apply a shearing force to the coating solution in the coating head by a method such as those disclosed in Japanese Patent Application (Laid-Open) Nos. 95174/1987 and 236968/1989. The viscosity of each coating solution should be in the range specified in Japanese Patent Application (Laid-Open) No. 8471/1991.

For realizing a multilayer constitution, successive multiple coating may, of course, be used in which a coating solution is applied and dried to form a lower layer and a magnetic layer is then formed thereon. Even with this coating technique, the intact effects of the present invention are obtained. However, from the standpoint of diminishing coating defects to improve quality such as freedom from dropouts, it is preferred to use any of the techniques for simultaneous multiple coating described above.

In an orientation treatment of the magnetic layer, a cobalt magnet or solenoid is used to orient the magnetic particles in the machine direction. It is preferred that the place in which the coating film is dried be made controllable by regulating the temperature and amount of the air fed for drying and the rate of coating. The rate of coating is preferably from 20 to 1,000 m/min and the temperature of the drying air is preferably 60° C. or higher. Predrying may be performed to an appropriate degree before the coated support enters the magnet zone.

After the coating and drying, the magnetic tape is usually subjected to a calendering treatment. In the calendering treatment, the coated support is treated with plastic calendering rolls made of a heat-resistant plastic, e.g., an epoxy, polyimide, polyamide, or poly(imide-amide), or with metallic calendering rolls. Especially when the support has a magnetic layer on each side, the coated support is preferably calendered between metal rolls. The calendering temperature is preferably 50° C. or higher, more preferably 100° C. or higher. The linear pressure is preferably 200 kg/cm (196 kN/m) or higher, more preferably 300 kg/cm (294 kN/m) or higher.

[Physical Properties]

The saturation flux density of the magnetic layer in the present invention is preferably from 0.1 to 0.3 T. The machine direction coercive force $H_c$ of the magnetic layer is as stated hereinabove; narrower coercive force distributions are preferred, with the SFD being preferably 0.6 or lower.

The coefficient of friction of the magnetic tape of the present invention with heads is generally 0.5 or lower, preferably 0.3 or lower, in the temperature range of from –10° C. to 40° C. and the humidity range of from 0 to 95%. The intrinsic surface resistivity of the magnetic tape on the magnetic layer side is preferably from $10^4$ to $10^{12}$ Ωg/sq, and the electrification potential of the tape is preferably from –500 to 500 V.

The modulus of elasticity at 0.5% elongation of the magnetic layer is preferably from 100 to 2,000 kg/mm$^2$ (0.98 to 19.6 GPa) in any in-plane direction, and the strength at break thereof is preferably from 10 to 70 kg/mm$^2$ (98 to 686 MPa). The modulus of elasticity of the magnetic tape is preferably from 100 to 1,500 kg/mm$^2$ (0.98 to 14.7 GPa) in any in-plane direction, the residual elongation thereof is preferably 0.5% or lower, and the degree of thermal shrinkage thereof as measured at any temperature not higher than 100° C. is preferably 1% or lower, more preferably 0.5% or lower, most preferably 0.1% or lower. The glass transition temperature (the temperature corresponding to a maximum of loss modulus in a dynamic viscoelasticity measurement made at 110 Hz) of the magnetic layer is preferably from 50 to 120° C., while that of the lower nonmagnetic layer is preferably from 0 to 100° C. The loss modulus is preferably in the range of from $1 \times 10^9$ to $8 \times 10^{10}$ μN/cm$^2$ and the loss tangent is preferably 0.2 or smaller. Too large loss tangents tend to result in sticking troubles. It is preferred that the medium be almost homogeneous in each of these thermal and mechanical properties in such a degree that the difference in each property between any in-plane directions in the medium is within 10%. The residual solvent content in the magnetic layer is preferably 100 mg/m or lower, more preferably 10 mg/m$^2$ or lower. The void content in each of the coating layers, i.e., the nonmagnetic layer and magnetic layer, is preferably 30% by volume or lower, more preferably 20% by volume or lower. Although a lower void content is desirable for attaining higher output, there are cases where a certain degree of void content is advantageous for some purposes. For example, in the case of disk media for which suitability for repetitions of running is important, higher void contents frequently bring about better running durability.

The central plane average surface roughness $R_a$ of the magnetic layer as measured with TOPO-3D, manufactured by WYKO Corp., over an area of about 250 μm×250 μm is generally 4.0 nm or lower, preferably 3.8 nm or lower, more preferably 3.5 nm or lower. The magnetic layer preferably further has a maximum height $R_{max}$ of 0.5 μm or smaller, a ten-point average roughness $R_z$ of 0.3 μm or lower, a central plane peak height $R_p$ of 0.3 μm or smaller, a central plane valley depth $R_v$ of 0.3 μm or smaller, a central plane areal ratio $S_r$ of from 20 to 80%, and an average wavelength $\lambda_a$ of from 5 to 300 μm. The surface projections present on the magnetic layer are preferably regulated so as to meet those surface properties to thereby optimize the electromagnetic characteristics and coefficient of friction of the layer. The state of these surface projections can be easily controlled by controlling the surface state of the support with a filler and by regulating the particle diameter and amount of the filler to be added to the magnetic layer as stated above or regulating the surface shape of the rolls to be used for calendering, etc. The curling of the magnetic tape is preferably regulated so as to be within ±3 mm.

In the case where the magnetic tape of the present invention has a nonmagnetic layer and a magnetic layer, it can be made to have a difference in any of those physical properties between the nonmagnetic layer and the magnetic layer according to purposes, a scan be easily presumed. For example, the magnetic layer is made to have a heightened modulus of elasticity to improve running durability and, at the same time, the nonmagnetic layer is made to have a lower modulus of elasticity than the magnetic layer to improve the head touching of the magnetic tape.

EXAMPLES

The present invention will be explained below in more detail by reference to Examples, but the present invention should not be construed as being limited thereto. In the following Examples and Comparative Examples, all "parts" are by weight.

Example 1

| <Preparation of Coating Solutions> | |
|---|---|
| (Magnetic Coating Solution) | |
| Ferromagnetic particles: magnetic barium ferrite particles (BaFe) Average tabular diameter, 30 nm; average tabular thickness, 10 nm; average particle volume, 5,800 nm³; $H_c$, 183 kA/m; $\sigma_s$, 50 A · m²/kg; $S_{BET}$, 65 m²/g | 100 parts |
| Vinyl chloride copolymer MR 110 (manufactured by Nippon Zeon Co., Ltd.) | 10 parts |
| Polyurethane resin $T_g = 82°$ C. | 5 parts |
| α-Alumina HIT 55 (manufactured by Sumitomo Chemical Co., Ltd.) Particle size, 0.2 μm | 5 parts |
| Carbon black #55 (manufactured by Asahi Carbon Co., Ltd.) Average primary particle diameter: 0.075 μm Specific surface area: 35 m²/g DBP absorption amount: 81 mL/100 g pH: 7.7 Volatile content: 1.0% | 1 part |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |

| -continued | |
|---|---|
| <Preparation of Coating Solutions> | |
| (Nonmagnetic Coating Solution) | |
| Nonmagnetic particles; acicular hematite Average long-axis length: 0.15 μm Acicular ratio: 7 BET specific surface area: 50 m²/g pH: 8.5 Surface layer treated: $Al_2O_3$ | 80 parts |
| Carbon black Average particle diameter: 20 nm | 20 parts |
| Vinyl chloride copolymer MR 110 (manufactured by Nippon Zeon Co., Ltd.) | 7 parts |
| Polyurethane resin $T_g$: 55° C. | 10 parts |
| Butyl stearate | 1 part |
| Stearic acid | 3 parts |
| Methyl ethyl ketone/cyclohexanone (8/2 mixed solvent) | 250 parts |

<Production of Computer Tape>

With respect to each of the coating solutions shown above, the ingredients were kneaded with a kneader and the resultant mixture was treated with a sand mill for 4 hours to disperse the particulate ingredients. To the resultant dispersions was added a polyisocyanate in an amount of 2.5 parts for the coating solution for nonmagnetic layer formation and in an amount of 3 parts for the coating solution for magnetic layer formation. Forty parts of cyclohexanone was further added to each dispersion. The resultant mixtures were filtered through a filter having an average pore diameter of 1 μm. Thus, coating solutions for nonmagnetic layer formation and magnetic layer formation, respectively, were prepared.

An aramid support having a thickness of 4.4 μm and a central plane average surface roughness of 2 nm was coated by simultaneous double coating in the following manner. The coating solution for nonmagnetic layer formation was first applied in such an amount as to give a lower layer having a thickness of 1.7 μm on a dry basis, and the coating solution for magnetic layer formation was simultaneously applied thereon in such an amount as to give a magnetic layer having a thickness of 100 nm on a dry basis. While the two layers were still wet, the magnetic particles were oriented with a cobalt magnet having a magnetic force of 0.6 T and a solenoid having a magnetic force of 0.6 T. After being dried, the web was calendered with a 7-roll calender in which all the rolls were metal rolls. The calendering was conducted at a temperature of 85° C. and a calendering speed of 200 m/min. Thereafter, a back layer having a thickness of 0.5 μm was formed by applying a coating solution (prepared by dispersing 100 parts of carbon black having an average particle size of 17 nm, 80 parts of calcium carbonate having an average particle size of 40 nm, and 5 parts of α-alumina having an average particle size of 200 nm in a nitrocellulose resin/polyurethane resin/polyisocyanate mixture).

The web was then slit into a ½ inch width, and the surface of the magnetic layer thereof was cleaned with a tape-cleaning apparatus obtained by modifying a slit-film unwinding/winding apparatus by attaching a nonwoven fabric and a razor so as to be pressed against the magnetic layer surface. Thus, a computer tape sample was obtained.

<Evaluation Methods>

The computer tape was evaluated for the following performances by the methods shown below. The results obtained are shown in Table 1.

(1) Magnetic Properties $H_c$, SQ⊥: Measurement was made with a vibrating sample magnetometer (manufactured by Toei Kogyo) at an $H_m$ of 10 kOe (≈796 kA/m). $H_c$ was measured in the tape machine direction, while SQ⊥ was measured in the direction perpendicular to the magnetic plane.

(2) S/N Ratio

Measurement was made with an apparatus obtained by modifying tape drive LTO Ultrium, manufactured by IBM. The recording current was set at the optimal value for each tape. For determining S/N ratio, signals having a wavelength of 0.3 μm were recorded, and the signals reproduced were analyzed for frequency with a spectrum analyzer manufactured by ShibaSoku Co., Ltd. The ratio of the output of the carrier signals (wavelength, 0.3 μm) to the integrated noise for the whole spectral region was taken as the S/N ratio.

Examples 2 to 5 and Comparative Examples 1 to 4

Computer tape samples were produced and evaluated in the same manner as in Example 1, except that the magnetic materials shown in Table 1 were used in forming a magnetic layer. In Table 1, the Fe—Co indicates an Fe—Co alloy, and the average tabular diameter and average tabular thickness mean average long-axis length and average short-axis length, respectively. The results obtained are shown in Table 2. The sample of Comparative Example 1 was a tape employing the Fe—Co alloy, and was used as a reference. In Comparative Example 2, $TiO_2$ (average particle diameter, 35 nm) was used as the nonmagnetic particles for the nonmagnetic lower layer. In Comparative Example 3, no nonmagnetic lower layer was formed.

TABLE 1

| Kind of magnetic material | BaFe1 | BaFe2 | BaFe3 | BaFe4 | BaFe5 | Fe—Co |
|---|---|---|---|---|---|---|
| Average tabular diameter (nm) | 30 | 15 | 38 | 30 | 45 | 100 |
| Average tabular thickness (nm) | 10 | 7 | 12 | 10 | 15 | 15 |
| Average particle volume (nm³) | 5800 | 1100 | 12000 | 5800 | 19500 | 17700 |
| $H_c$ [kA/m] | 183 | 155 | 185 | 300 | 130 | 146 |
| $\sigma_s$ (Am²/kg) | 50 | 46 | 53 | 50 | 55 | 125 |
| $S_{BET}$ (m²/g) | 65 | 87 | 52 | 65 | 43 | 56 |

The results given in Table 2 show the following.

The tapes of Examples 1 to 5 according to the present invention each had satisfactory electromagnetic characteristics with an excellent S/N ratio in each of forward and reverse operations.

On the other hand, the tape of Comparative Example 2 had an increased value of SQ⊥ and a reduced amount of magnetizable components in the machine direction because of the use of $TiO_2$ in the lower layer, resulting in a reduced S/N ratio (reverse) and an increased S/N difference. The tape of Comparative Example 3, which had no lower layer, had a further increased value of SQ⊥ and had no cushioning effect. Consequently, the tape of Comparative Example 3 had an even lower S/N ratio and a larger S/N difference based on the large magnetic-layer thickness. The tape of Comparative Example 4 had a reduced S/N ratio because the magnetic layer had too low a value of $H_c$ due to the large particle size of the BaFe.

The magnetic tape of the present invention, when used in a recording/reproducing system employing an MR head, is reduced in noise and has a reduced difference in noise level between recording/reproducing directions. Consequently, the magnetic tape has excellent suitability for high-density recording in the serpentine mode. Moreover, since the magnetic tape of the present invention is of the coated type, it has excellent productivity.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A magnetic tape comprising a support having thereon a non-magnetic layer and a magnetic layer comprising ferromagnetic particles and a binder as the main components, wherein the ferromagnetic particles contained in the magnetic layer are hexagonal-ferrite magnetic particles having an average tabular diameter of from 10 to 40 nm, and the magnetic layer has a machine direction coercive force $H_c$ of from 190 to 350 kA/m, a squareness ratio SQ⊥ as measured in the direction perpendicular to the magnetic plane of 0.35 or lower, and a thickness of from 30 to 300 nm.

2. The magnetic tape as in claim 1, which has a multilayer constitution including a nonmagnetic lower layer.

TABLE 2

| | Example | | | | | Comparative Example | | | |
|---|---|---|---|---|---|---|---|---|---|
| | 1 | 2 | 3 | 4 | 5 | 1 | 2 | 3 | 4 |
| Kind of magnetic material | BaFe1 | BaFe2 | BaFe3 | BaFe1 | BaFe4 | Fe—Co | BaFe1 | BaFe1 | BaFe5 |
| Magnetic layer | | | | | | | | | |
| $H_c$ [kA/m] | 190 | 162 | 190 | 191 | 330 | 146 | 190 | 190 | 138 |
| SQ⊥ | 0.3 | 0.41 | 0.18 | 0.46 | 0.3 | 0.2 | 0.53 | 0.6 | 0.32 |
| Thickness [nm] | 100 | 100 | 100 | 280 | 40 | 100 | 100 | 340 | 100 |
| Nonmagnetic layer | present | present | present | present | present | Present | present | absent | present |
| S/N (forward) [dB] | 26 | 27 | 24.5 | 23 | 24.9 | 17.2 | 23.6 | 20.5 | 17.6 |
| S/N (reverse) [dB] | 24.5 | 25.3 | 24.1 | 21.3 | 23.7 | 16.8 | 19.4 | 15.5 | 16.3 |
| S/N difference | 1.5 | 1.7 | 0.4 | 1.7 | 1.2 | 0.4 | 4.2 | 5.0 | 1.3 |

3. The magnetic tape as in claim 1, wherein the machine direction coercive force $H_c$ of the magnetic layer is from 190 to 280 kA/m.

4. The magnetic tape as in claim 1, wherein the magnetic layer has a magnetization distribution that the amount of components which undergo a (magnetic) flux revolution upon application of a magnetic field of 80 kA/m or lower is smaller than 1%.

5. The magnetic tape as in claim 1, wherein the magnetic layer has a thickness of from 50 to 250 nm.

6. The magnetic tape as in claim 1, wherein the magnetic layer has a squareness ratio SQ⊥ as measured in an in-plane direction is from 0.6 to 0.95.

7. A magnetic tape which is used for a magnetic recording and reproducing method in which signals recorded on a magnetic tape containing a support having thereon a non-magnetic layer and a magnetic layer comprising ferromagnetic particles and a binder as the main components are reproduced, the method comprising: reproducing the signals recorded on the magnetic tape with a magneto resistive head, wherein the ferromagnetic particles contained in the magnetic layer are hexagonal-ferrite magnetic particles having an average tabular diameter of from 10 to 40 nm, and the magnetic layer has a machine direction coercive force $H_c$ of from 190 to 350 kA/m, a squareness ratio SQ⊥ as measured in the direction perpendicular to the magnetic plane of 0.35 or lower, and a thickness of from 30 to 300 nm, wherein recording and reproducing are conducted in a linear serpentine mode.

8. A magnetic recording and reproducing method in which signals recorded on a magnetic tape containing a support having thereon a non-magnetic layer and a magnetic layer comprising ferromagnetic particles and a binder as the main components are reproduced, the method comprising: reproducing the signals recorded on the magnetic tape with a magneto resistive head, wherein the ferromagnetic particles contained in the magnetic layer are hexagonal-ferrite magnetic particles having an average tabular diameter of from 10 to 40 nm, and the magnetic layer has a machine direction coercive force $H_c$ of from 190 to 350 kA/m, a squareness ratio SQ⊥ as measured in the direction perpendicular to the magnetic plane of 0.35 or lower, and a thickness of from 30 to 300 nm.

9. The magnetic recording and reproducing method according to claim 8, wherein recording and reproducing are conducted in a linear serpentine mode.

* * * * *